United States Patent Office 3,081,192
Patented Mar. 12, 1963

3,081,192
METHOD OF APPLYING MAR-RESISTANT SURFACE COATINGS TO THERMOPLASTIC SHEETS
Elbert M. Idelson, Newton Lower Falls, Mass., assignor to Polaroid Corporation, Cambridge, Mass., a corporation of Delaware
No Drawing. Filed Oct. 10, 1960, Ser. No. 61,408
20 Claims. (Cl. 117—64)

The present invention relates to plastic coating processes and more particularly to processes for applying cross-linked mar-resistant, surface coatings to plastic sheets and laminates and especially to plastic optical elements.

A simplified flow diagram of the process is as follows:

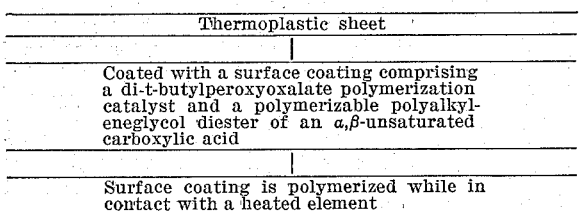

Objects of the present invention are to provide improved methods for catalyzing the in situ polymerization of such surface coatings on plastic sheets and laminates and especially to provide improved methods for catalyzing the polymerization of such coatings on plastic optical elements.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description:

Thermo-setting, cross-linked polymers are finding wide use as mar-resistant finishes for plastic sheets and laminates. Because of the inherent insolubility and non-thermoplasticity of such coatings, it is usually necessary to carry out the polymerization of such polymers in situ. The present invention is concerned with the catalyzation of such polymerizations and especially with the catalyzation of such polymerizations on plastic optical elements such as disclosed in the copending application of Blout, Buzzell, and Farney, Serial No. 539,219, filed October 7, 1955.

The above-mentioned copending application is concerned with the application of mar-resistant cross-linked polymeric surface coatings of diethylenic-substituted polyalkyleneglycols to plastic optical elements and especially to plastic light-polarizing elements. In general such light-polarizing elements comprise a lamination or sandwich of a central layer of light-polarizing material such as, for example, as molecularly oriented, dichroically stained, polyvinyl alcohol bonded on each of its surfaces to an outer protective sheet of a thermoplastic polymeric material such as cellulosic plastic, e.g., cellulose acetate butyrate, cellulose acetate, cellulose triacetate. In general the mar-resistant surface coatings are applied by coating a film of the monomeric material on the surface of the plastic sheet or laminate and effecting polymerization by holding the sheet in contact with an optically smooth, heated element. In a preferred embodiment of such processes, the polymerization is carried out continuously by applying a thin film of the monomeric material to the sheet of plastic material and holding the sheet, while it is advancing, in contact with the optically smooth periphery of a heated, rotating drum for a sufficient period to effect polymerization. Generally, free-radical polymeriaztion catalysts and particularly diisopropylpercarbonate are used to effect polymerization.

The present invention is particularly concerned with catalyzing the continuous process, i.e., a process in which the coating is continuously and progressively applied to the surface of a sheet and is then polymerized in situ thereon while the sheet is moving continuously through the coating and polymerizing stages. Preferably, polymerization should be accomplished relatively quickly, and in a preferred embodiment of such processes is accomplished within less than 3 minutes. In addition, the polymerization in such continuous processes is preferably carried out at a relatively low temperature in order that the inner thermoplastic layers will not exceed their softening points and undergo stretching. Further, it is desirable that the catalysts have a high rate of decomposition so as to effect the rapid polymerization and also to insure that a minimum of residual catalyst will be present in the mar-resistant coatings after polymerization. Such residual catalyst may have deleterious effects on the mar-resistant coatings themselves, or on adjacent layers upon migrating into such layers, e.g., discoloration of dyes disposed therein.

It has been found that by using di-t-butylperoxyoxalate, as the catalyst, the in situ polymerization of polyalkyleneglycol diesters of polymerizable $\alpha,\beta$-unsaturated carboxylic acids on thermoplastic sheets may be brought about in a short period of time, with rapid decomposition of the catalyst and at temperatures at which the underlying thermoplastic layers will not exceed their softening points. Moreover, the residual catalyst was observed to have little to no effect on the mar-resistant layers or the adjoining layers.

In carrying out a continuous process within the scope of this invention a sheet of thermoplastic material, for example, the light-polarizing lamination heretofore described, which comprises a central light-polarizing layer or film adhesively bonded to two outer protective plastic layers of a cellulose compound such as cellulose acetate butyrate, is coated on one surface with a layer of monomeric material containing the di-t-butylperoxyoxalate. The coating may be applied as a viscous mass, in any suitable manner, and passed under a doctor blade, or it may be sprayed or flowed onto the sheet. The coated sheet is then brought into contact with an optically smooth surface such, for example, as the peripheral surface of a heated, rotating drum. The sheet is held against the drum under sufficient pressure to cause the surface of the applied coating to assume the smooth optical properties of the drum surface. While the sheet is held against the drum, it is heated and polymerization of the coating is effected. The drum continuously rotates, and the sheet continuously advances with the coated surface in contact with the drum for the period during which polymerization is effected, for example for a period of from one and one-half to three minutes. The opposite surface of the sheet is then similarly coated and, after both surfaces have been so treated, optical elements are stamped or cut from the sheet.

Polymerization may be effected, in a non-continuous manner, for example, by holding the sheet of plastic optical material, coated with the monomeric film, between two optically smooth heated platens. As in the continuous processes, it is desirable to effect polymerization at a low temperature so that the underlying thermoplastic layers will not exceed their softening point. Similarly, it is desirable that the catalyst rapidly decompose and have a low rate of migration so as to reduce the undesirable effects of residual catalyst.

The preferred materials, which are used in the formation of the mar-resistant coatings on the plastic optical element, are diesters of polyalkyleneglycols and polymerizable α,β-unsaturated carboxylic acids. Monomers which are derivatives of polyalkyleneglycols comprising 2 to 5 alkylene groups and especially those wherein the alkylene groups comprise 2 to 3 and especially 2 carbon atoms have been found to be particularly useful. Preferred monomers are the diesters formed from the polyalkyleneglycols and methacrylic and acrylic acids. As examples of useful monomers, mention may be made of: diethyleneglycol dimethacrylate, diethyleneglycol diacrylate, triethyleneglycol dimethacrylate, triethyleneglycol diacrylate, tetraethyleneglycol dimethacrylate, tetraethyleneglycol diacrylate, pentaethyleneglycol dimethacrylate, and pentaethyleneglycol diacrylate.

The polymerization of the monomers employed in the practice of the present invention is usually strongly inhibited by atmospheric oxygen and should, therefore, be carried out in an air-free atmosphere, for example in carbon dioxide, or against a surfacing element, such for example as the optically smooth periphery of the drum.

In a preferred embodiment of this invention, about 0.25% to 1% di-t-butylperoxyoxalate, based on the weight of the monomer, is employed. Especially useful results have been obtained using about 0.25%; however, it should be understood that this amount may be varied to suit particular needs. By using about 0.25% di-t-butylperoxyoxalate, polymerization may be usually effected in about three minutes while holding the heated, optically smooth elements at about 185° F. At such temperatures the inner thermoplastic sheets will generally not exceed their softening point. Further, no deleterious effects from the residual catalyst on the mar-resistant coatings or in the adjacent layers of the plastic optical elements are observed. Previously, using the free radical catalysts heretofore taught, it was usually necessary to run the polymerization at undesirable high temperatures, for example, 220–225° F., to effect polymerization and to eliminate the deleterious effects of the catalysts.

The following nonlimiting example illustrates the preparation of di-t-butylperoxyoxalate:

*Example 1*

25 gms. of oxalyl chloride were added, dropwise, with stirring at −5 to 0° C., to a flask containing 40 gms. of 90% t-butylhydroperoxide and 32 gms. of anhydrous pyridine dissolved in 400 cc. of toluene. The resulting pyridine hydrochloride precipitate was filtered off and washed with 15 cc. of toluene. The toluene solution having the di-t-butylperoxyoxalate dissolved therein was washed with ice water, separated, dried with magnesium sulfate, filtered and stored at −50° C.

The following nonlimiting example is illustrative of the processes within the scope of this invention.

*Example 2*

A laminate, comprising a center layer of a molecularly oriented polyvinyl alcohol sandwiched between two sheets of dyed cellulose acetate butyrate was coated with a solution comprising:

Tetraethyleneglycol dimethacrylate (containing
  0.006% hydroquinone) _____gms__ 92
Cellulose nitrate (thickener) _____gms__ 8
10% solution of di-t-butylperoxyoxalate in
  toluene _____cc__ 2.55 and heated in an air-free atmosphere in contact with an optically smooth platen at about 185° F., for about three minutes to bring about polymerization. No deleterious effects of residual catalyst on the optical element were observed.

Abrasion tests, such as those disclosed in the A.S.T.M. Handbook on Standards on Plastics, 1953 edition, on the optical element produced above, show that the mar-resistant coatings catalyzed by the process of this invention have abrasion resistance which is comparable to that produced through the use of previously taught catalysts at such higher and undesirable temperatures as 220–225° F.

The preferred monomers for use in the processes are generally of relatively low viscosity and, in order that they may be more readily handled and applied to the surface of the optical elements to be coated, the viscosity of the coating composition may be increased by mixing with the monomer a small percentage of a viscosity-increasing polymeric material. A preferred viscosity-increasing material is cellulose nitrate. The addition of the cellulose nitrate to the coating composition is believed also to improve the adhesion or bond between the coating and the plastic sheet to which it is applied, and this is especially so when the plastic sheet comprises cellulose acetate butyrate. In certain instances, for example where the sheet to which the coating is applied comprises cellulose triacetate or where polymerization of the coating is effected in an oven, it has been found desirable to employ a thin coating of nitrocellulose, which is applied to the plastic sheet prior to the application of the coating mixture thereto. It is to be understood, however, that the use of the subcoat may not be essential to the practice of the present invention.

Preferably, the coating applied to the plastic sheet is of such thickness as to give adequate abrasion or mar resistance, and, where optical elements are subsequently to be cut or stamped from the sheet, the coating should be no thicker than is necessary to give such resistance, for a thick mar-resistant coating has been found to increase greatly the difficulty of cutting or stamping out lenses from the coated sheet as they tend to craze or crack adjacent the cut edges. A preferred coating thickness lies within 0.0003 to 0.001 inch. Coatings of this thickness are adequately mar-resistant. A sheet so coated on both surfaces may have such optical elements as lenses stamped therefrom, and these lenses may be subsequently shaped in a suitable press to the desired curvature, whereas thicker coatings give no effective additional mar resistance and increase substantially the difficulty of cutting out and shaping lenses from the coated sheet.

It will be understood that the methods of catalyzing the polymerization of the mar-resistant coatings described herein may be applied to optical elements and devices other than light-polarizing lenses and filters. They may, for example, be applied to colored, cellulosic filters and lenses such as are employed in nonpolarizing sunglasses and visors and to molded, thermoplastic articles where scratch- or mar-resistant properties are desired.

Care should be taken in handling the di-t-butylperoxyoxalate used in the process of this invention because of its explosive reaction on impact. It can be conveniently stored in a 10% toluene solution in a cool place.

Since certain changes may be made in the above process without departing from the scope of the invention herein involved, it is intended that all matter contained in the above description shall be interpreted as illustrative and not in a limiting sense.

What is claimed is:

1. In a process for producing thermoplastic sheets having mar-resistant surface coatings, wherein a thin coating solution comprising a polymerizable diester of polyalkyleneglycol and an α,β-unsaturated carboxylic acid is applied to the surface of said sheet and polymerized in situ while the coating is held in contact with a heated element having an optically smooth surface, the improvement of using di-t-butylperoxyoxalate as the catalyst to effect polymerization.

2. A process as defined in claim 1 wherein said heated element is at a temperature of about 185° F.

3. A process as defined in claim 1 wherein said monomer is a derivative of a polyalkyleneglycol containing 2 to 5, inclusive, alkylene groups.

4. A process as defined in claim 1 wherein said thermoplastic sheet is a sheet of plastic optical material.

5. A process as defined in claim 3 wherein said alkylene groups are ethylene groups.

6. A process as defined in claim 1 wherein about 0.25% to 1% of di-t-butylperoxyoxalate based on the weight of the monomer is employed.

7. A process as defined in claim 1 wherein about 0.25% of di-t-butylperoxyoxalate based on the weight of the monomer is employed.

8. A process as defined in claim 1 wherein said monomer is tetraethyleneglycol dimethacrylate.

9. A process as defined in claim 1 wherein said coating solution comprises about 10% of cellulose nitrate.

10. A process as defined in claim 4 wherein said sheet of plastic optical material comprises a light-polarizing layer.

11. In a process for continuously applying a mar-resistant coating to a thermoplastic sheet, wherein a coating solution comprising a polymerizable diester of a polyalkyleneglycol and an $\alpha,\beta$-unsaturated carboxylic acid is applied to the surface of said sheet and polymerization is effected by holding said sheet, while it is advancing in contact with the optically smooth surface of a rotating, heated drum, the improvement of employing di-t-butylperoxyoxalate as the catalyst.

12. The process as defined in claim 11 wherein said heated drum is at a temperature of about 185° F.

13. The process as defined in claim 11 wherein said monomer is a derivative of a polyalkyleneglycol containing 2 to 5 alkylene groups.

14. A process as defined in claim 11 wherein said thermoplastic sheet is a sheet plastic optical material.

15. A process as defined in claim 13 wherein said alkylene groups are ethylene groups.

16. A process as defined in claim 11 wherein said coating solution comprises about 0.25% of said di-t-butylperoxyoxalate based on the weight of the monomer.

17. A process as defined in claim 11 wherein said monomer is tetraethyleneglycol dimethacrylate.

18. A process as defined in claim 11 wherein said coating solution comprises about 10% of cellulose nitrate.

19. A process as defined in claim 14 wherein said sheet of plastic optical material comprises a light-polarizing layer sandwiched between two thermoplastic layers.

20. A process as defined in claim 19 wherein said thermoplastic layers are cellulosic derivatives.

References Cited in the file of this patent

UNITED STATES PATENTS

| | | |
|---|---|---|
| 2,320,536 | Pollack et al. | June 1, 1943 |
| 2,332,461 | Muskat et al. | Oct. 15, 1943 |
| 2,481,809 | Barnes | Sept. 13, 1949 |
| 2,527,400 | Cooper | Oct. 24, 1950 |
| 2,631,960 | Dafter | Mar. 17, 1953 |
| 2,719,132 | Schweitzer | Dec. 27, 1955 |
| 2,955,958 | Brown | Oct. 11, 1960 |
| 3,019,131 | Haas et al. | Jan. 30, 1962 |